United States Patent [19]

Preston, Jr.

[11] Patent Number: 4,709,758
[45] Date of Patent: Dec. 1, 1987

[54] HIGH TEMPERATURE PACKER FOR WELL CONDUITS

[75] Inventor: Dan C. Preston, Jr., Whittier, Calif.

[73] Assignee: Baker Oil Tools, Inc., Orange, Calif.

[21] Appl. No.: 806,030

[22] Filed: Dec. 6, 1985

[51] Int. Cl.[4] .................. E21B 33/128; E21B 33/129
[52] U.S. Cl. .................................. 166/120; 166/139; 166/140; 166/196; 277/235 R; 277/DIG. 6
[58] Field of Search ..................... 166/120, 138–140, 166/179, 196, 209, 210, 212, 217; 277/116, 124, 180, 230, 233, 234, 235 R, DIG. 6

[56] References Cited

U.S. PATENT DOCUMENTS

| | | | |
|---|---|---|---|
| Re. 31,933 | 7/1985 | Taylor et al. | 166/120 |
| 3,330,357 | 7/1967 | Elliston | 166/134 |
| 3,391,740 | 7/1968 | Edwards, Jr. | 166/120 |
| 3,391,742 | 7/1968 | Davis | 166/189 |
| 4,116,451 | 9/1978 | Nixon et al. | 277/180 |
| 4,131,160 | 12/1978 | Cochran | 166/120 |
| 4,146,093 | 3/1979 | Horvath et al. | 166/120 |
| 4,176,715 | 12/1979 | Bigelow et al. | 166/138 |
| 4,559,249 | 12/1985 | Arigaya et al. | 277/234 |

*Primary Examiner*—Stephen J. Novosad
*Assistant Examiner*—William P. Neuder
*Attorney, Agent, or Firm*—Norvell & Associates

[57] ABSTRACT

A packer for effecting steam treatment of a production formation of a subterranean well comprises an insulated mandrel which is slidably inserted within the bore of an inner tubular body assembly. An outer operative tubular assembly surrounds the inner assembly and mounts a plurality of drag blocks, upper and lower cone elements, a plurality of radially displaceable slips cooperating with the upper and lower cone elements, and an outer packing element fabricated by an assemblage of high temperature resistant, non-resilient seal elements formed primarily of graphite. An inner packing element is provided in the inner tubular body assembly, utilizing additional high temperature resistant, non-resilient seal elements formed primarily of graphite, which sealingly engages the insulated mandrel. The packer is set by rotation of the tubing string to position a J-pin in the axially elongated portion of a J-slot, followed by upward movement of the tubing string to effect compression of the external packing element to form a seal with the casing wall and concurrently, expansion of the slips by the upper and lower cones. A ratcheting element mounted in the same ring as the J-pin traps the axial forces within the packing element and the interengaged cones and slips.

4 Claims, 23 Drawing Figures

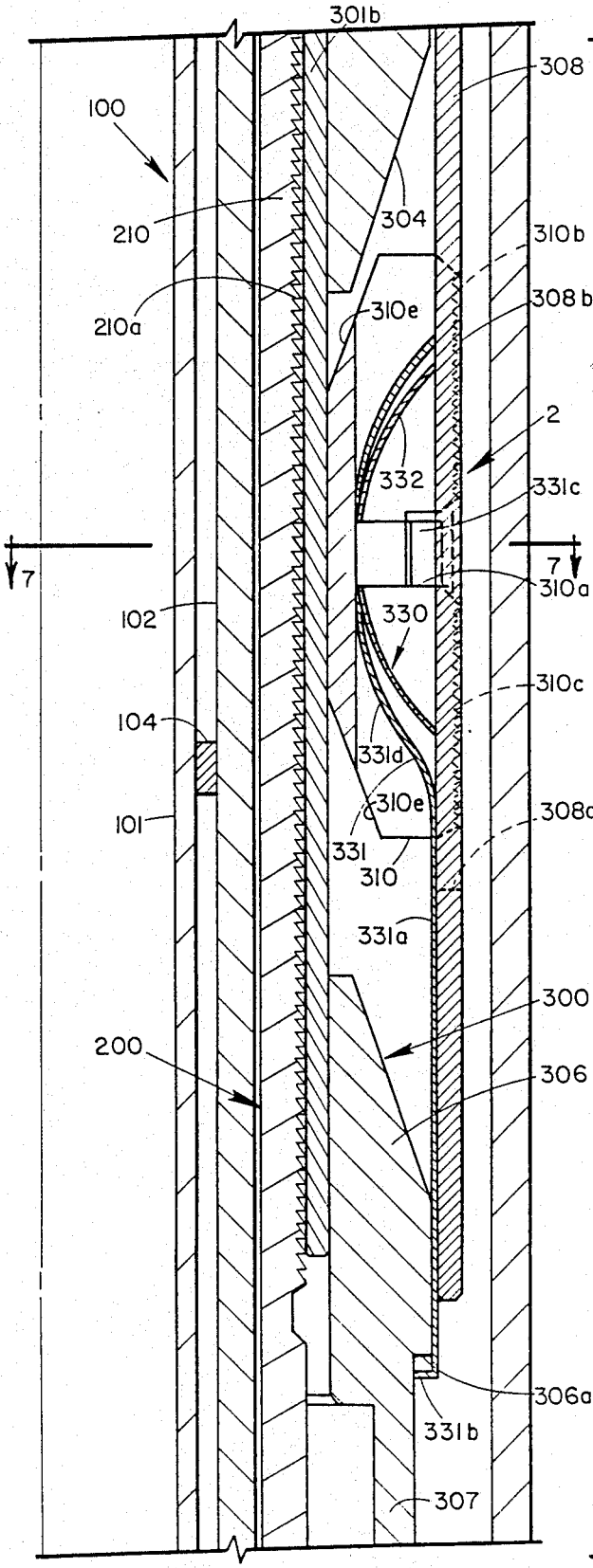
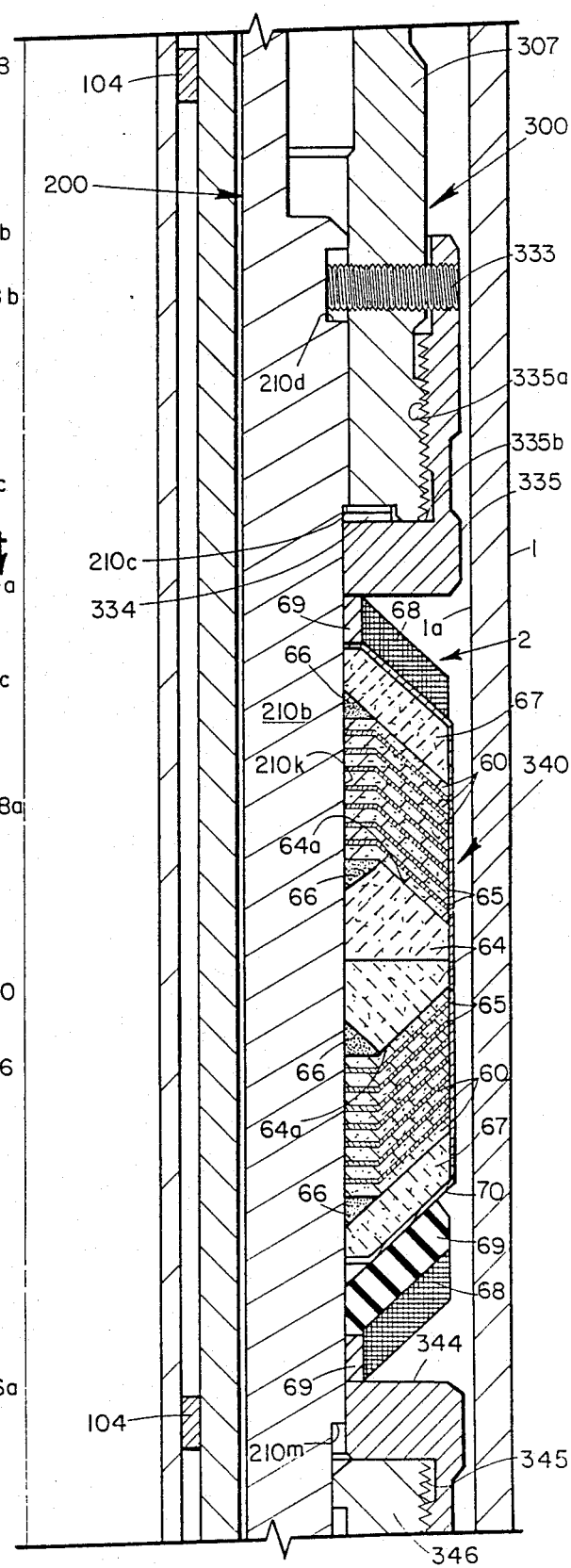
FIG. 1D
FIG. 1E

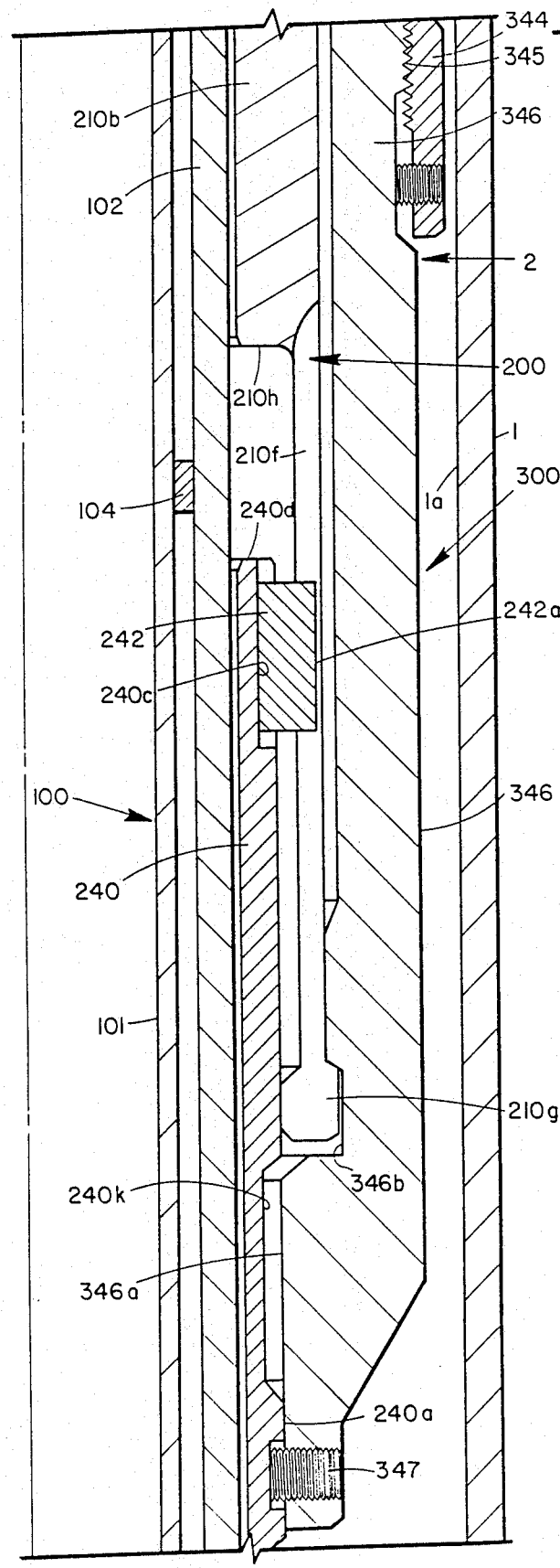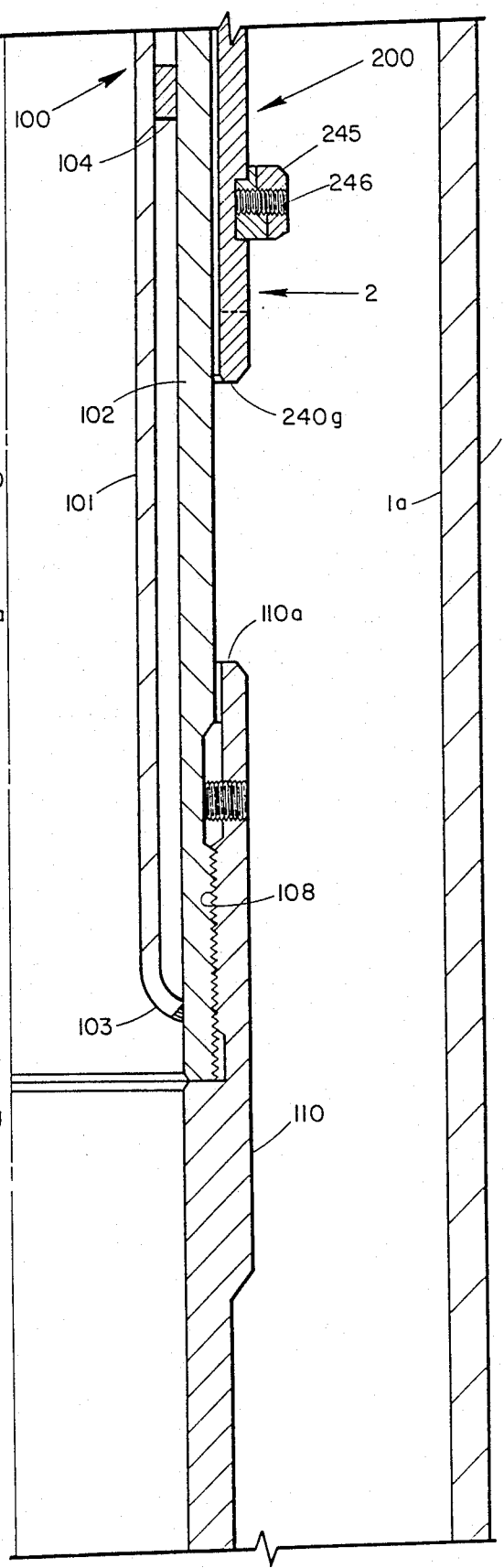

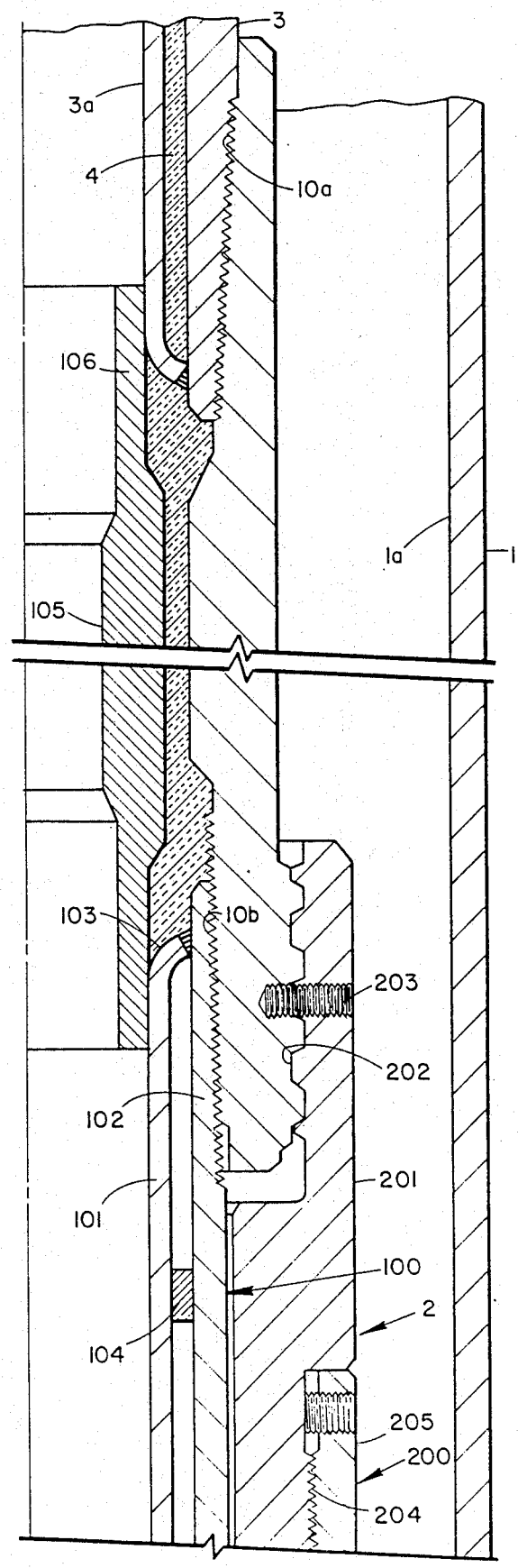
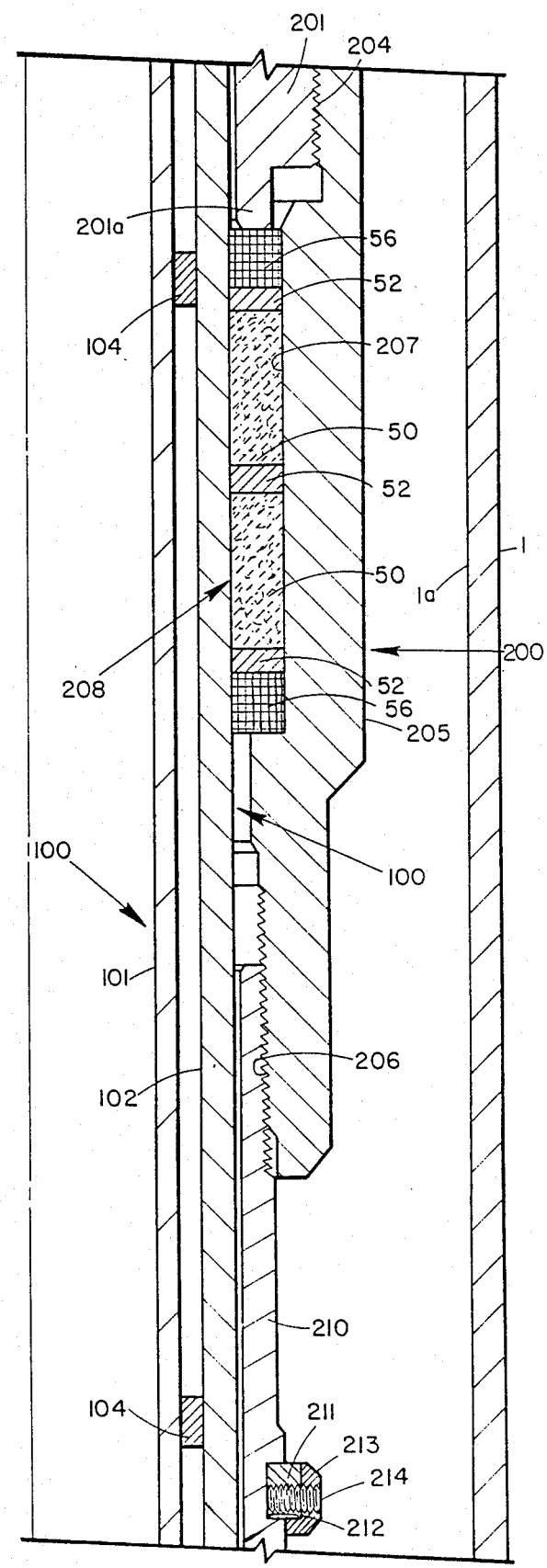
FIG. 2A
FIG. 2B

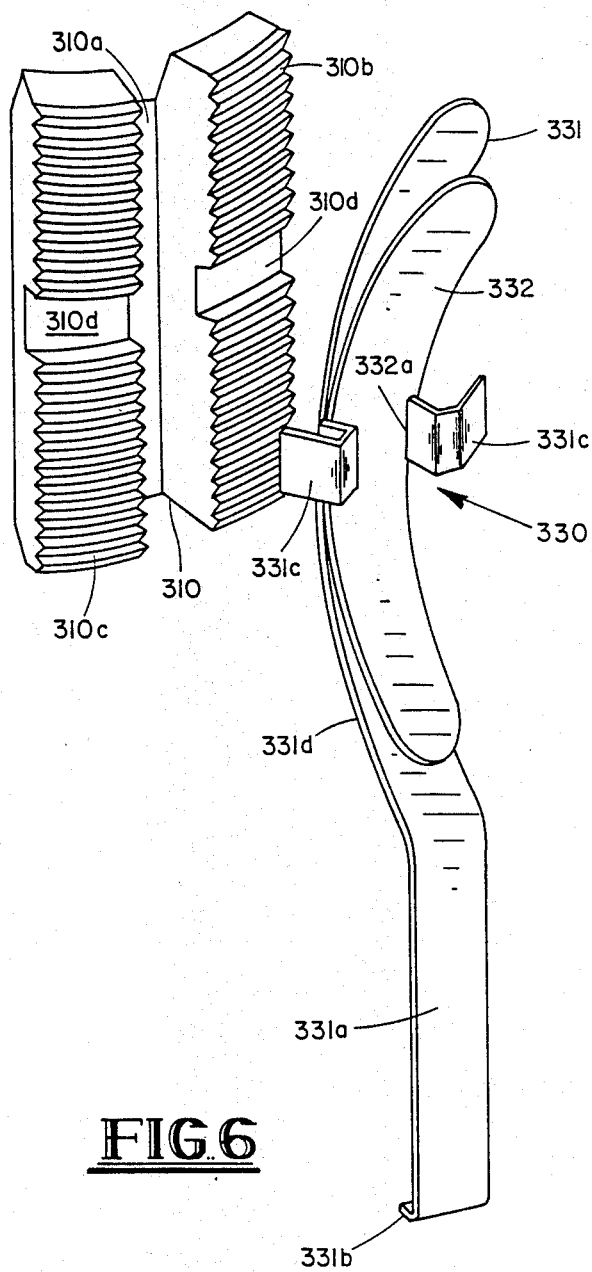
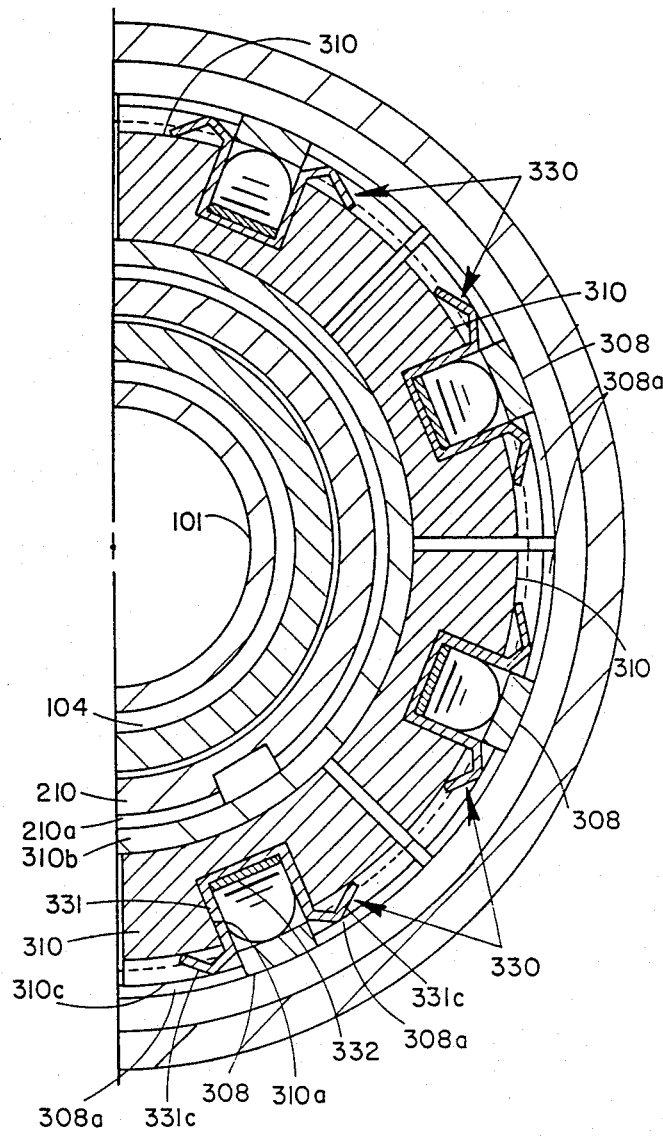
FIG.6
FIG.7

HIGH TEMPERATURE PACKER FOR WELL CONDUITS

This application contains the same disclosure as pending applications Ser. No. 806,031, (BP-250) Ser. No. 811,093 (BP-255) and Ser. No. 805,882 (BP-256) all filed concurrently herewith and assigned to the same assignee as this application, but each claiming different subject matter.

BACKGROUND OF THE INVENTION

1. Field of the Invention

The invention relates to well packers adapted to be set in packed-off condition in a well casing, or similar conduit strings, which are subsequently exposed to high temperature steam.

2. Description of the Prior Art

Well packers have heretofore been set in well bores and subjected to high temperature steam. For example, in secondary or tertiary recovery of production from well bores, a well packer may be used in connection with the injection of high temperature steam within the surrounding formation. Temperature changes occur as a result of the varied rate at which the steam is injected through the packer into the surrounding well bore and the inherent pressure of the steam applies a significant force to the packer. Well packers under such conditions tend to loosen and leak for several reasons. These include the extrusion of the packing material through clearing spaces in the packer and between the packer and the surrounding well conduit, and also due to expansion and contraction of the packer parts due to the substantial temperature changes. Leakage is also encountered in the slick joint normally provided between the production tubing and the packer.

Packers have been specifically designed to operate under such high temperature and high pressure conditions, for example, see U.S. Pat. No. 3,131,764 to J. F. Muse et al and U.S. Pat. No. 4,307,781 to Preston, Jr. et al. These packers, as well as others existing in the prior art, have not been completely satisfactory for use in steam treatment of wells. In the first place, such packers have relied upon either asbestos or elastomeric materials to form the external and internal packing elements of the packer. Asbestos is obviously undesirable in the modern world due to its potential carcigenic effects upon people handling or fabricating the seals. Elastomeric seals are generally formed of organic materials which are subject to substantial degradation at temperatures in excess of 400° F. It is therefore desirable that a packer be available that will withstand temperatures up to 700° F. and steam pressures on the order of 2500 pounds per square inch without resulting in leakage or degradation of the seal element. Also, such packer should minimize heat loss from the steam passing downwardly through the slick joint commonly provided in such packers.

This invention provides a high temperature resistant packer composed primarily of two tubular assemblies. An inner tubular body assembly is detachably securable to the bottom end of a tubing string by a left hand threaded connection to a connector sub to effect the running in and setting of the packer. An outer operative tubular assembly is provided including, in vertically downward sequence, a drag block unit, a connecting block, a slip and cone assemblage incorporating both upper and lower cones with the upper cone abutting the connecting block, a packing assembly abutting the lower cone, an abutment element abutting the lower end of the packing element to apply an axial compressive force thereto, and a detachable connection mechanism operative between the abutment element and the lower portions of the inner tubular body assembly.

The connecting block incorporates a radially disposed J-pin which projects into a J-slot provided on the exterior of the inner tubular body assembly. During run-in, the cooperation of the J-pin with the J-slot prevents any relative axial displacement of the inner tubular body assembly with respect to the outer operative assembly. When the packer is positioned at the desired location in the well bore, generally above the formation to be steam treated, the inner tubular body is rotated approximately 90° to the left to bring the J-pin into an axially elongated portion of the J-slot, thus permitting relative upward movement of the inner tubular body assembly with respect to the outer operative tubular assembly. Application of a vertically upward force to the inner tubular body assembly by the tubing string to which it is connected, applies an axial force to the packing element which in turn is transmitted to the lower cone and then transmitted through the slip to the upper cone which is held in a fixed position by the connecting block. The connecting block is further provided with a radially shiftable detent which cooperates with ratchet-like threads on the periphery of the internal body assembly to lock the body assembly against any subsequent downward displacement with respect to the outer tubular body assembly. Thus the axial force imparted to the packing element and to the slip and cone unit are trapped therein by the cooperation of the detent in the connecting block with the ratchet threads. The upward movement of the inner tubular body assembly is discontinued when the resisting force indicates that the slips have been moved into biting engagement with the casing wall and the packing element expanded into sealing engagement with the casing wall.

Weight is then set down on the packer unit to remove any slack that might exist in the slip and cone assemblage. The packer is then pressure tested through the application of pressure to the casing annulus above the packer. If the testing indicates the packer is satisfactorily set and sealed, the tubing string is rotated to the right to disconnect the inner tubular assembly from the connector sub. Steam is introduced through the tubing string and the third element of the packer, which comprises a mandrel or slick joint threadably secured to the connector sub and having sealing engagement with an internal packing element provided in the bore of the inner tubular body assembly. Such mandrel is preferably fabricated with a double-walled insulated configuration so as to minimize the loss of the heat transfer from this internal portions of the mandrel which are exposed to steam to those external portions which are surrounded by water and well fluids.

Additionally, the internal packing element constitutes a special assemblage of non-elastic seal elements formed of materials that are not thermally degradable at temperatures up to 700° F. and are assembled into an internal recess provided on the internal tubular body assembly to sealingly cooperate with the cylindrical periphery of the mandrel or slick joint. The mandrel or slick joint is preferably insulated to minimize heat loss from the downwardly flowing steam.

With the aforedescribed construction, the fluid pressure generated by the high temperature steam introduced into the production formation below the packer, is applied as a direct axial force to the external packing elements, and, through such elements, to the slip and cone assemblies to further increase the forcible contact of the packing elements with the casing bore and the biting engagement of the slips with such casing bore.

The thermal expansion and contraction of the tubular string relative to the set packer is readily absorbed by the elongated insulated mandrel or slick joint which permits movement of the tubing string in either direction relative to the set packer.

If, for any reason, it is desired to remove the packer from the well casing, such removal may be accomplished by manipulation of the tubular mandrel which is always threadably connected to the tubular string extending to the well surface. A release abutment is provided on the bottom portions of the tubular mandrel in a position below the outer operative tubular assemblage. Such release abutment is engagable with the detachable connection mechanism that is normally operatively connected between the abutment element and the lower portions of the inner tubular body assembly. Such engagement is effected by upward movement of the tubing string and, after the shearing of shear screws, effects the release of the detachable connection mechanism so that the outer operative tubular assembly is disengaged from the inner tubular body assembly. This relieves the axial force applied to the external packing elements, hence permitting that assembly, as well as the lower cone element to shift downwardly with respect to the inner tubular body assembly. Hence, the slips may be released from their biting engagement with the casing wall and the entire packer removed by an abutting connection between the releasing abutment carried on the bottom portion of the double walled mandrel or slick joint and the bottom portions of the inner tubular body assembly, plus an abutment shoulder on the inner tubular body assembly engaging the bottom portions of the outer operative tubular assembly.

Further advantages of the invention will be readily apparent to those skilled in the art from the following detailed description, taken in conjunction with the annexed sheets of drawings, on which is shown a preferred embodiment of the invention.

BRIEF DESCRIPTION OF DRAWINGS

FIGS. 1A, 1B, 1C, 1D, 1E, and 1F collectively represent a vertical sectional view of a packer embodying this invention with the elements thereof shown in their run-in position with respect to a wall casing; FIGS. 1A, 1B, 1D, 1E, and 1G are quarter-sectional views, while FIG. 1C is a full sectional view.

FIGS. 2A, 2B, 2C, 2D, 2E, 2F, and 2G are respectively views similar to FIGS. 1A, 1B, 1C, 1D, 1E, 1F, and 1G but showing the elements of the packer in their set position.

FIG. 6 is a perspective view of the slips and the retaining springs therefor.

FIG. 7 is a sectional view taken on the plane 7—7 of FIG. 1D.

DESCRIPTION OF PREFERRED EMBODIMENT

Figure 1A:
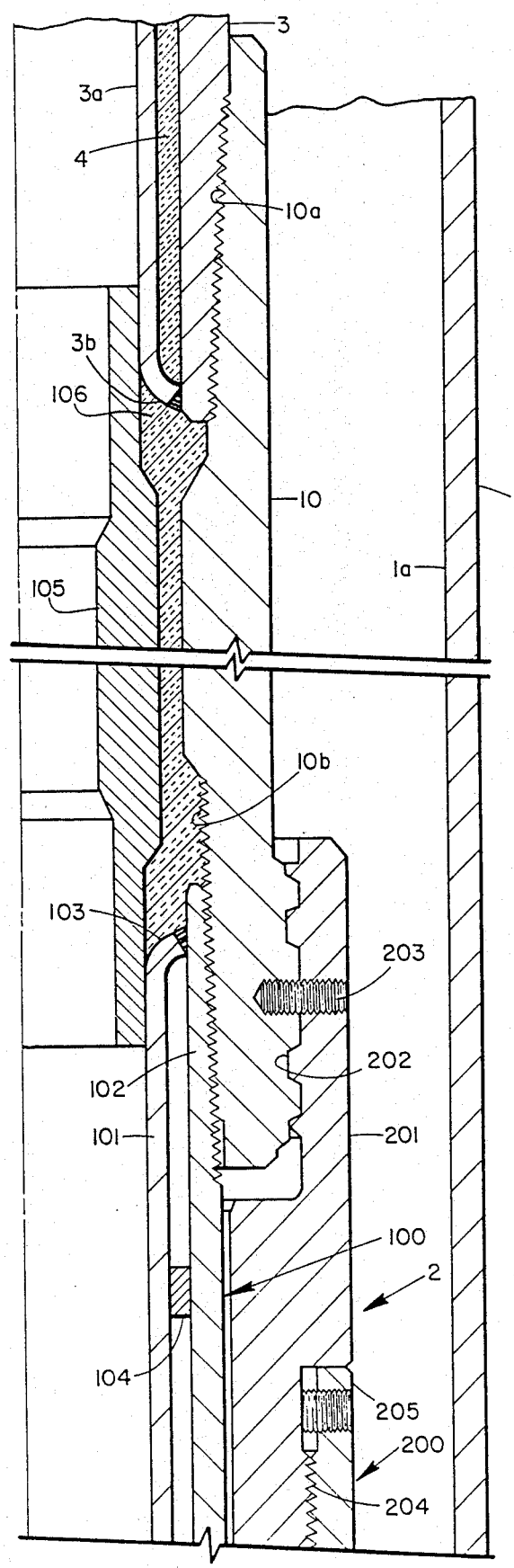

Referring to the drawings, a packer 2 embodying this invention comprises the telescopic assembly of a mandrel 100 within an inner tubular body assembly 200, the components of which are all indicated by numbers in the 200 series, which, in turn, is telescopically inserted within an outer operative tubular assembly 300, the separate elements of which being all indicated by numbers in the 300 series.

The upper end of the inner tubular body assembly 200 is provided with a sub 201 defining internal left hand threads 202. Threads 202 are engaged by external threads provided on a connector sub 10 which is provided with internal threads 10a at its upper end for connection to the bottom end of an insulated tubing string 3. Tubing string 3 may be fabricated in the manner described in U.S. Pat. No. 4,423,778 with an inner wall 3a confining an insulating insert or packing 4. The left-hand threads 202 are secured for run-in and setting purposes by a radially disposed shear screw 203. Connector sub 10 is additionally provided with internal threads 10b at its lower portion for connection to the insulated mandrel or slick joint 100 which extends through the entire body of the packer.

Top sub 201 is provided with external threads 204 on its bottom portion which cooperate with internal threads formed on a seal housing sub 205. Seal housing sub 205 is provided at its lower end with internal threads 206 for connection to external threads provided on the top of an elongated tubular body 10.

Sleeve housing 205 is further provided with an elongated internal recess 207 within which is mounted an annular seal assembly 208. Compression force is applied to annular internal seal assembly 208 by a downwardly projecting annular end portion 201a formed on the bottom end of the top sub 201. The detailed construction of the internal seal assembly 208 will be described hereinafter, but for the moment it should be noted that is effects a high temperature resistant sealing engagement with the external cylindrical surface of the insulated mandrel 100 and the internal surface of recess 207.

Below the threads 206, the inner tubular body element 210 is provided with an abutment ring assemblage comprising an inner ring 211 mounted in an annular slot 212 formed on the periphery of the inner body element 210. An outer ring 213, preferably formed of an antifriction metal, is secured in surrounding relationship to the inner ring 211 by a plurality of bolts 214.

The bottom face 213a of outer ring 213 abuts the top end face 301a of an outer tubular body 301. Body 301 is provided with a plurality of peripherally spaced recesses 302 to respectively accommodate conventional drag blocks 315. Drag blocks 315 are mounted for radial movement with respect to the outer body 301. Radially disposed springs 316 impose a constant bias on the drag blocks 315 urging them into frictional engagement with the bore wall 1a of the casing 1. A restraining ring 317 is secured by threads 317a and set screws 317b to the upper end of outer body 301 and limits the radial outward movement of the upper ends of drag blocks 315.

Figure 4:
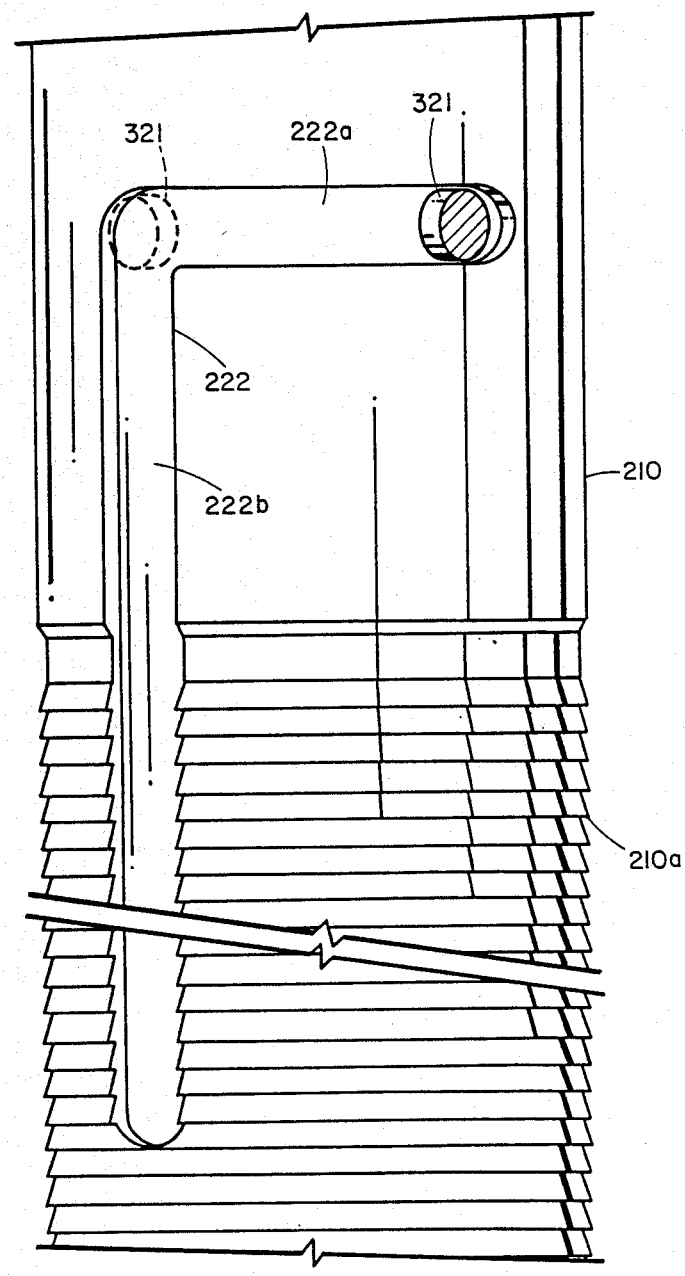
FIG. 4 is an elevational view showing the configuration of the J-slot employed in the packer and the cooperation of such J-slot with a J-pin.

Below the drag block recesses 302, the outer tubular body defines an annular internal recess 303 within which is mounted an annular connector block or ring 320. In order to permit the assemblage of the ring 320 in the annular recess 303, the outer tubular body 301 is split in a generally radial plane as indicated at 301', but this split in no manner affects the operation of the outer tubular body 301. Connector ring 320 defines a mounting for a J-pin 321 which extends into a J-slot 222 provided or the external surface of the inner tubular body 210 (FIG. 4).

On the side of connector ring 320 opposite the J-pin 321, a gap 323 is provided for the mounting therein of a segment shaped detent 324 for radial movements. A plurality of radially disposed springs 325 urge the detent 324 radially inwardly into engagement with the external surface of the internal tubular body 6. At a location spaced below the position of the detent 324 in the run-in position, a plurality of axially extending ratchet teeth 210a (FIGS. 1C and 4) are provided on the external surface of the internal tubular body 210 and are shaped to cooperate with corresponding teeth 324a provided on the detent 224 so as to permit only upward movement of the inner tubular body assembly 200 relative to the outer tubular operative assembly 300.

The lower portion of body element 301 below the radial split 301' defines a downwardly facing external shoulder 301a below the location of the detent 324. Shoulder 301a provides an abutment surface for the support of an annular cone 304. A plurality of bolts 305 secure cone 304 in the illustrated position of abutment with the shoulder 301a.

The lower portion of the outer body sleeve 301 terminates in a thin walled sleeve portion 301b which extends downwardly in surrounding relation to the internal body 210 and terminates beneath an annular lower cone 306 which is provided on the upper end of a downwardly extending sleeve 307.

A slip retention sleeve 308 is provided, which, at its upper end, overlies the lower end of the plurality of drag blocks 315. Sleeve 308 is secured to the outer assembly body 301 by internal threads 308a and the threads are locked by a set screw 308b. Slip retention sleeve 308 thus overlies the upper cone 304 and portions of the lower cone 306 and define an annular space around such cones. A plurality of segment shaped slip elements 310 are mounted within such annular space. Each slip element 310 is provided on its outer arcuate surface with two sets of oppositely directed teeth 310b and 310c for effecting a biting engagement with the bore wall 1a of casing 1. Additionally, an axially extending slot 310a is provided on the outer surface of each slip element 310.

The slip retention sleeve 308 is provided with a plurality of peripherally spaced windows 308a having solid bar portions disposed intermediate each adjacent pair of windows. The bar portions 308b respectively overlie the axial slots 310c provided on the slip segments 310.

In accordance with this invention, the slip segments 310 are biased to their radially inward position shown in FIG. 1D by a spring assembly 330. Each spring assembly 330 is actually a combination of two leaf springs 331 and 332. The main leaf spring 331 is provided with an elongated tail portion 331a, which is positioned between the retention sleeve 308 and the outermost surface of the lower cone 306. The end 331b of tail portion 331a is bent downwardly to engage a downwardly facing shoulder 306a formed on the lower cone 306. Thus, upward movement of the main leaf spring 331 is prevented during run-in so long as the lower cone 306 is anchored against axial movement, which it is, in a manner to be later described.

Additionally, the main leaf spring 331 is provided with a pair of lateral spring projections 331c which respectively engage transverse slots 310d provided in the respective slip 310. Thus each slip 310 is effectively anchored against upward axial movement during run-in by the respective main leaf spring 331. Additionally, the compression of the bowed portion 331c of the main leaf spring 331 imposes a radially inward bias on each of the slip segments 310 to secure them in a retracted position.

If additional inward biasing force is required, the second leaf spring 332 is inserted in the assembly in overlying and radially aligned relationship to the main leaf spring 331. Second leaf spring 332 is provided with edge notches 332a adjacent its central portion to respectively accommodate the lateral spring projections 331c of the main leaf spring 331 and secure the respective spring in the position illustrated in FIG. 8. provided on the slip segments 310.

In accordance with this invention, the slip segments 310 are biased to their radially inward position shown in FIG. 1D by a spring assembly 330. Each spring assembly 330 is actually a combination of two leaf springs 331 and 332. The main leaf spring 331 is provided with an elongated tail portion 331a which is positioned between the retention sleeve 308 and the outermost surface of the lower cone 306. The end 331b of tail portion 331a is bent downwardly to engage a downwardly facing shoulder 306a formed on the lower cone 306. Thus, upward movement of the main leaf spring 331 is prevented during run-in so long as the lower cone 306 is anchored against axial movement, which it is, in a manner to be later described.

Additionally, the main leaf spring 331 is provided with a pair of lateral spring projections 331c which respectively engage transverse slots 310d provided in the respective slip 310. Thus each slip 310 is effectively anchored against upward axial movement during run-in by the respective main leaf spring 331. Additionally, the compression of the bowed portion 331c of the main leaf spring 331 imposes a radially inward bias on each of the slip segments 310 to secure them in a retracted position.

If additional inward biasing force is required, the second leaf spring 332 is inserted in the assembly in overlying and radially aligned relationship to the main leaf spring 331. Second leaf spring 332 is provided with edge notches 332a adjacent its central portion to respectively accommodate the lateral spring projections 331c of the main leaf spring 331 and secure the respective spring in the position illustrated in FIG. 8. Slips 310 are otherwise of conventional configuration and are provided with upper and lower sets of transverse teeth 310b and 310c to bite into the casing bore surface 1a and prevent axial movements of the packer when the slips are set.

The lower end of the internal body 210 of the internal body assembly 200 is of increased radial thickness as shown at 210b (FIG. 1E), and provides support for the lower end of the sleeve portion 307 of the lower cone 306. An annular abutment block 335 is secured by internal threads 335a to the lower end of sleeve portion 307 and, in such secured position, effects a clamping of a spiral lock ring 334 between the upwardly facing surface 335b of the abutment block 335 and the bottom end surface of the sleeve portion 307 of the lower cone 306. Spiral lock ring 334 also abuts against a downwardly facing shoulder 210c formed on the exterior of the internal tubular body 210. A set of shear screws 333 traverse block 335, the sleeve portion 307, and engage an annular groove 210d formed on inner body 210.

An outer packing assemblage 340 is mounted on the cylindrical periphery of the lower sleeve portion 210b of the inner tubular body assemblage 200. The packing assemblage 340 will be described in detail hereinafter. At the lower end of the packing assemblage 340, an abutment sleeve 344 is provided which is threadably secured to the upper end of a force transmitting sleeve 346 by threads 345. The lower end 346a of the force-transmitting sleeve 346 is of inwardly increased radial thickness to rest against a slightly enlarged cylindrical surface 240a provided on an extension sleeve 240 of the inner tubular body assembly 200. A set of shear screws 347 secure the bottom end of force-transmitting sleeve 346 to extension sleeve 240 for run-in purposes.

The bottom end of the inner tubular body 210 is formed with a plurality of peripherally spaced collet arms 210f having enlarged head portions 210g. The collet head portions 210g are held by surface 240a of extension sleeve 240 in engagement with an internal annular latching recess 346b formed in the force-transmitting sleeve 346.

The top end of the extension sleeve 240 is provided with peripherally spaced notches 240c to mount a correspondingly shaped spider element 242 having peripherally spaced ridges 242a which project radially between the collet arms 210f and thus key the extension sleeve 240 to the tubular body 210 for co-rotation. Additionally, the extreme upper end surface 240d of the extension sleeve 240 is axially spaced from a downwardly facing surface 210h which is located at the beginning of the collet arms 210f, so that upward movement of the extension sleeve 240 will produce an upward displacement of the inner tubular body assemblage 200.

Below the location of the enlarged collet heads 210g, an annular recess 240k is formed in the periphery of extension sleeve 240 to permit the collet heads 210g to be cammed inwardly and thus release their engagement with the force transmitting sleeve 346. This action is required to effect the removal of the packer from the well bore after the packer has been set. An abutment ring 245 is secured to the bottom end of the extension sleeve 240 by a plurality of peripherally spaced bolts 246. Abutment ring 245 will engage the bottom end of the force transmitting-sleeve 346 when the entire packer unit 2 is to be removed from the well bore.

It was previously mentioned that the entire packer 2 is traversed by a tubular mandrel 100 which has a cylindrical exterior surface in sealing engagement with the internal seal assembly 208 provided in the upper portions of the inner tubular body assembly 200. While not necessary for the operation of the described apparatus as a packer, when utilizing the packer for the injection of steam into a well, it has been found highly desirable to form the mandrel 100 in a double walled configuration. Thus, an inner wall 101 is provided in spaced relationship to the outer wall 102 and welded thereto at the ends by out-turned wall portions 103 (FIG. 1A). Spacer ribs 104 may be provided on inner wall 101 at axially spaced intervals. Insulation may be provided between the inner and outer walls 101 and 102 or the space between such walls may be evacuated. In any event, the resistance to heat transfer through the walls of the mandrel 100 is substantially increased. Additionally, an inner sleeve 105 may be suitably mounted to confine the space between the upper curved end 103 of mandrel well 101 and the bottom curved end 3b of inner wall 3a of the insulated tubing string 3. An insulating insert or packing 106 is inserted in the space defined between sleeve 105 and the inner wall 10c of connector sub 10.

Figure 5A:
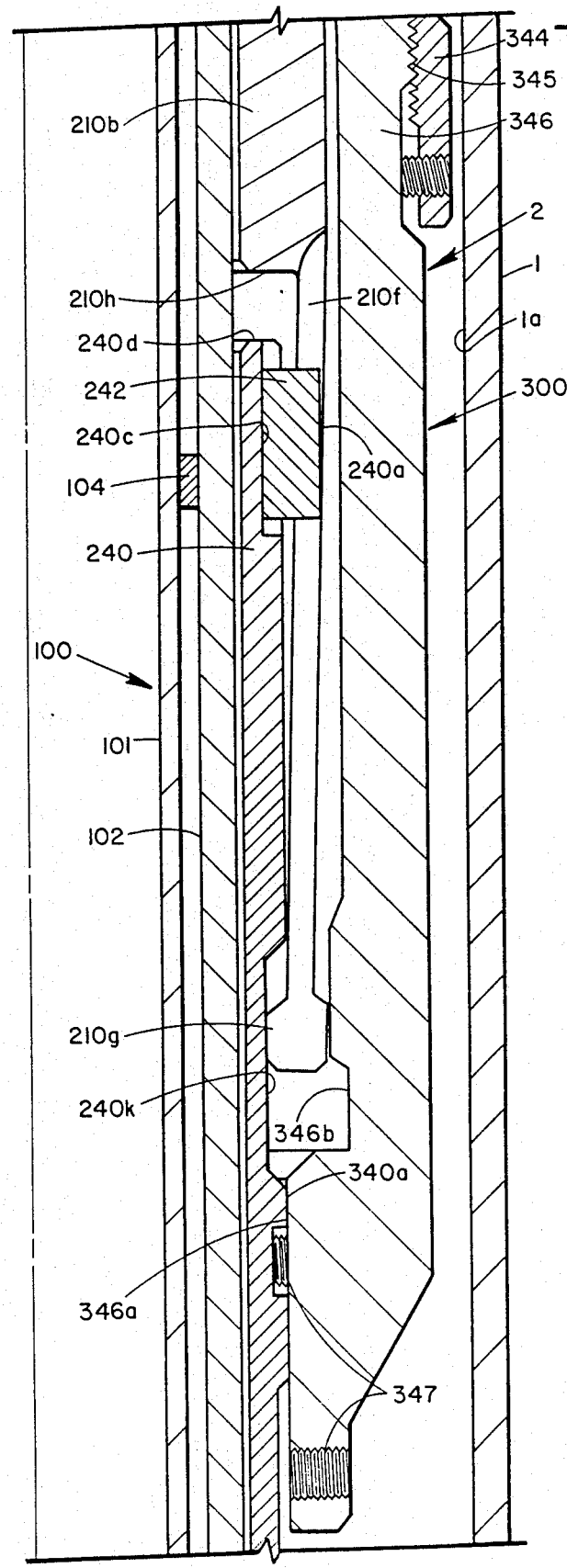
FIGS. 5A and 5B are views respectively similar to FIGS. 1F and 1G but illustrating the release of the connecting mechanism between the inner tubular body assembly and the outer operative tubular assembly by axial upward movement of the tubing string.
Figure 5B:
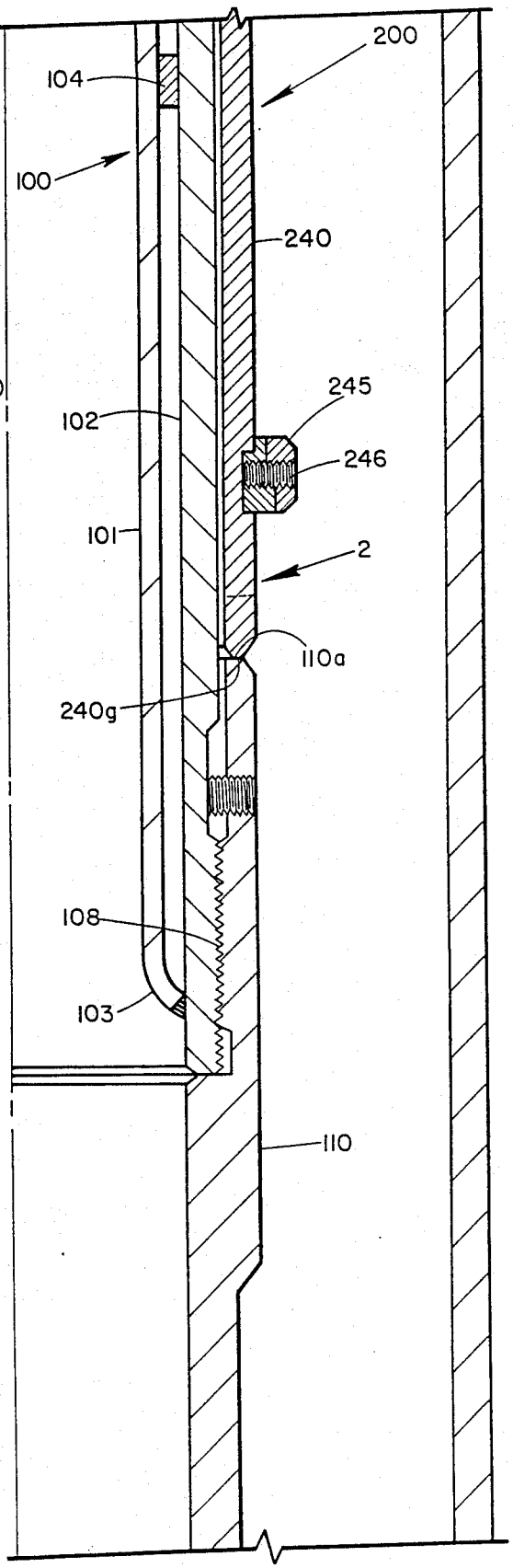

The bottom end of mandrel 100 is connected by threads 108 to a bottom connecting sub 110 for effecting a connection to an additional length of tubing or directly to a screen element permitting the in-flow of production fluid into the bore of the insulated mandrel 100 and the out flow of steam to heat the formation. It will be noted that the bottom connecting sub 110 is provided with an upwardly facing end surface 110a which is sized so as to effect an abutting engagement with the bottom surface 240g of the extension sleeve 240, as shown in FIG. 5B, to effect the release of the inner tubular assemblage 200 from the outer tubular assemblage 300 by upward movement of mandrel 100, and thus permit the relaxation of any axial force applied to the packing element 340 and the upper and lower cones so as to permit release of the slip elements 310 from engagement with the casing wall 1a.

Figure 1B:
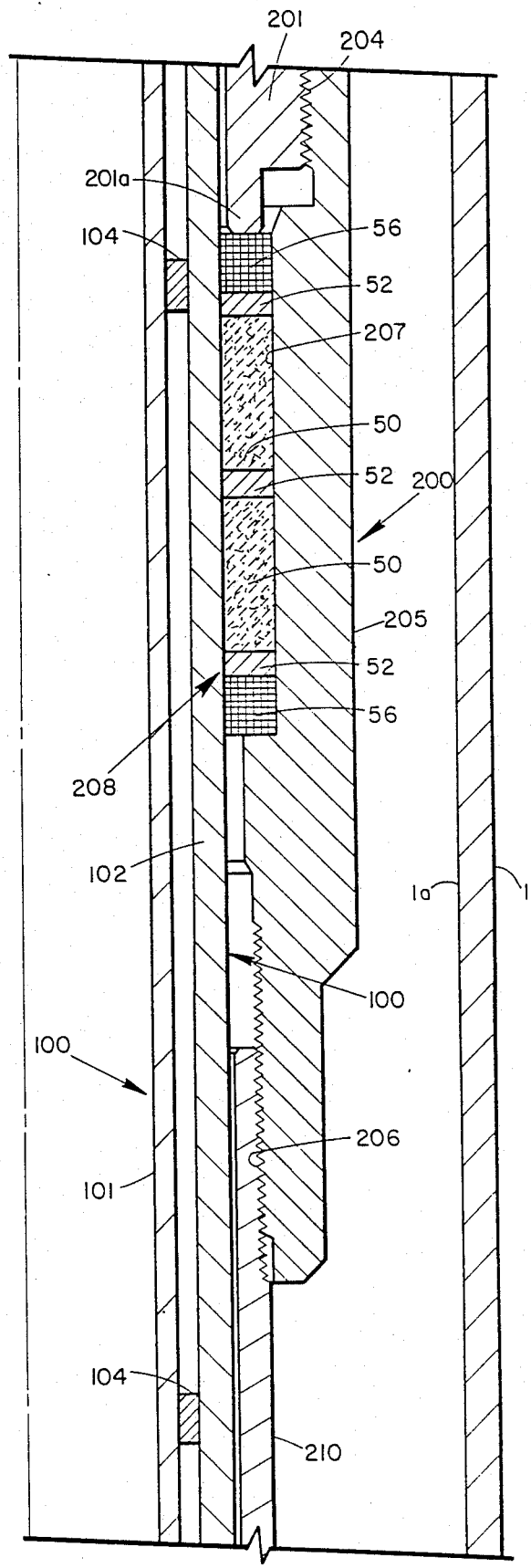
Figure 1C:
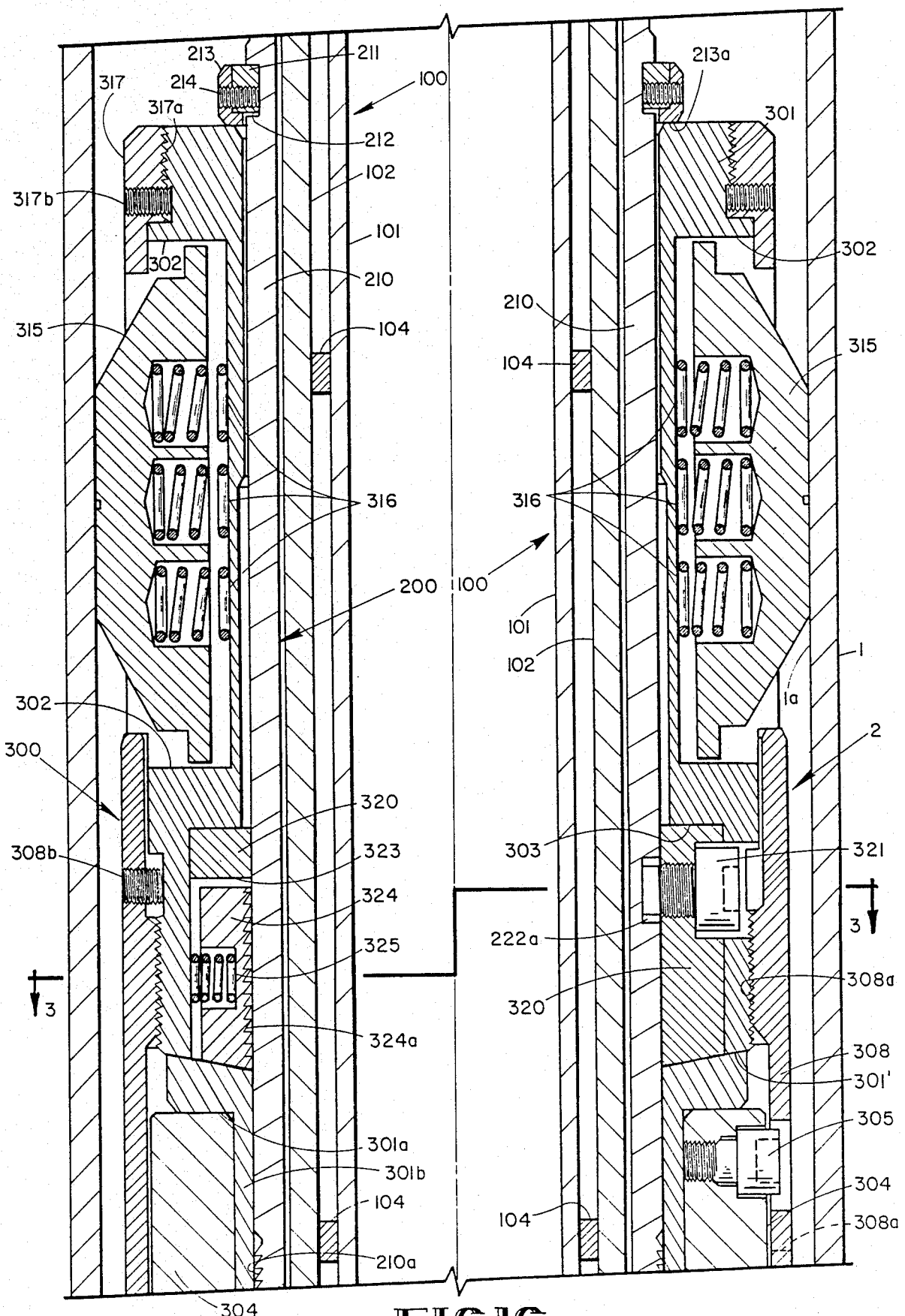
Figure 8:
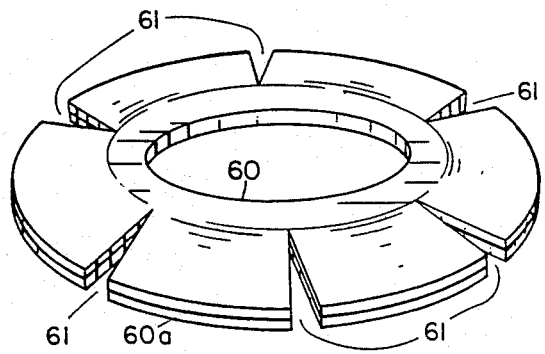
FIG. 8 is a perspective view of the discs forming the sealing elements of the outer packing.
Figure 10:
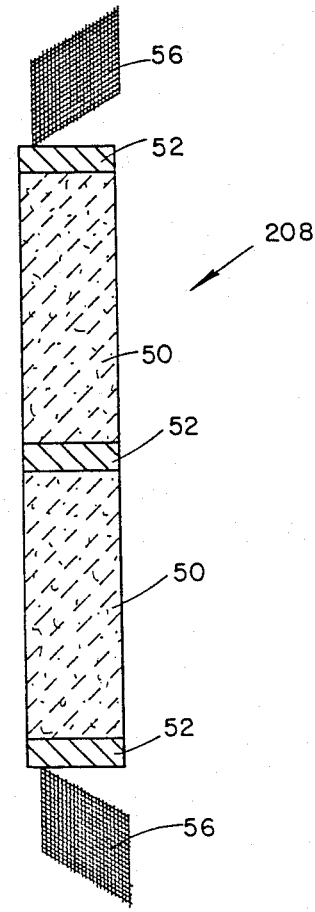
FIG. 10 is a quarter-sectional view of the inner packing assembly prior to application of compressive force thereto.

Referring now to FIGS. 1B and 10, the detailed confiuration of the inner packing element 208 will now be described. As illustrated in FIG. 8, the packing element 208 comprises a plurality of die-formed rings 50 which are formed primarily of graphite and a minor quantity of ash. For example, the material utilized in the rings 50 may comprise 80% graphite and 20% carbon oxide ash, which is then die-formed into the ring configuration in which it is employed in the internal packing element 208. Such material is sold under the trademark "Grafoil" by Carbon Products Division of Union Carbide Corporation. Each ring of die-formed "Grafoil" is abutted on both axial ends by a relatively ductile annular spacer 52. For example, ductile cast iron may be employed as the spacer. Adjacent each axial end of the entire assemblage, a force-transmitting ring element 56 is provided, which is preferably die-formed as a non-rectangular parallelogram (FIG. 8) from a relatively soft metal wire mesh. For example, a wire mesh comprising essentially 100% nickel would be satisfactory. When the inner packing element 208 is assembled in the inner tubular body assemblage 200, (FIG. 1B) its force-transmitting end elements 56 are deformed from their non-perpendicular parallelogram position into their rectangular parallelogram configuration illustrated in FIG. 1B by the axial force transmitted to the inner packing assemblage 208 by the threading of the upper sub 201 into the seal housing sleeve 205. Sufficient axial force is applied to the assemblage to cause a non-elastic radial deformation of all of the individual elements of the assemblage and thus the "Grafoil" rings are expanded into intimate sealing engagement between the inner surface 207a of the packing housing sub 205 and the outer cylindrical surface of the mandrel 100. At the same time, deformation of the end elements 56 will move these elements into close proximity to the same surfaces and thus minimize the opportunity for extrusion of the "Grafoil" rings 50 into the unsealed space defined between the end elements and the adjoining metallic surfaces. A packing element of this configuration has been found to be extremely effective at temperatures of 700° F. and corresponding steam pressures on the order of 2500 PSI.

Figure 9:
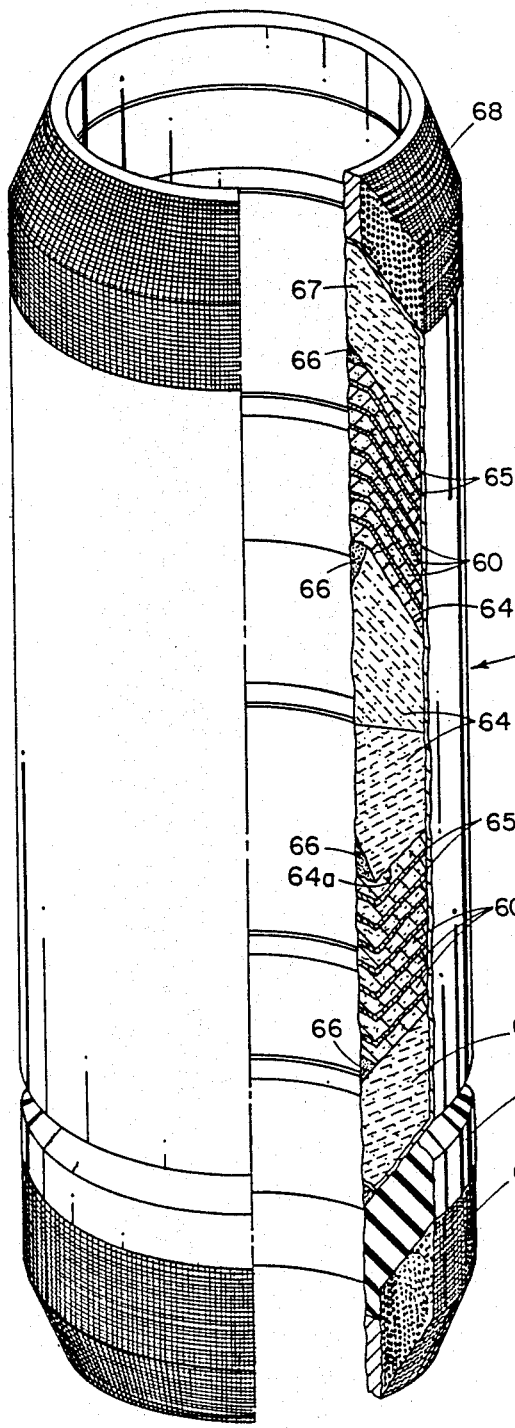
FIG. 9 is a perspective view, partly in section, of the outerpacking assembly as initially assembled.

The outer packing assembly 340 is similarly formed in a unique manner. Referring to FIGS. 1E, 8 and 9, the outer packing 340 comprises at least two axially stacked sets of discs or petals 60. Each disc 760 is formed from metallic wire netting 60a impregnated with "Graphoil" material. Each disc is then formed with a plurality of peripherally spaced slots or notches 61 as best shown in FIG. 8. The discs 60 are then die-formed into the angular cross sectional configuration illustrated in FIGS. 1E and 9 wherein the external diameters of the discs 60 are reduced with the corresponding closing of the slots 61. It will be noted that slots 61 in one disc are angularly spaced from the slots 61 in the adjoining discs. Moreover, in the die-forming operation, a ring of wire netting 65, which may be formed from stainless steel or Iconel, is placed intermediate each of the "Grafoil" discs. The die-forming operation thereafter integrally incorporates the wire netting discs into the "Grafoil" discs and provides a greatly reinforced sealing element.

Two stacks of die-formed, angularly shaped discs 60 are then placed adjacent to annular die-formed rings 64 of graphite yarn reinforced by wire. The radially outer surfaces 64a of the die-formed graphite yarn are shaped to respectively conform to the inclined surface portions 60a of the "Grafoil" discs 60. The inner portions of rings 64 are sloped away from the relatively radial inner portions of the "Grafoil" discs 60 to accommodate triangularly shaped rings 66 of die-formed "Grafoil". Similar rings 66 are provided adjacent the axially outer radial surfaces of the two stacks of die-formed "Grafoil" discs 60. Axial forces are then transmitted to this assemblage through a die-formed ring 67 of graphite fiber and wire and, adjacent the outer ends of the rings 67, a non-perpendicular parallelogram ring 68 of die-formed chemical resistant metallic mesh is provided. Materials such as #304 stainless steel or Inconel are suitable for the formation of rings 68. Each of the rings 68 rests upon a metallic support sleeve 69.

Figure 2C:
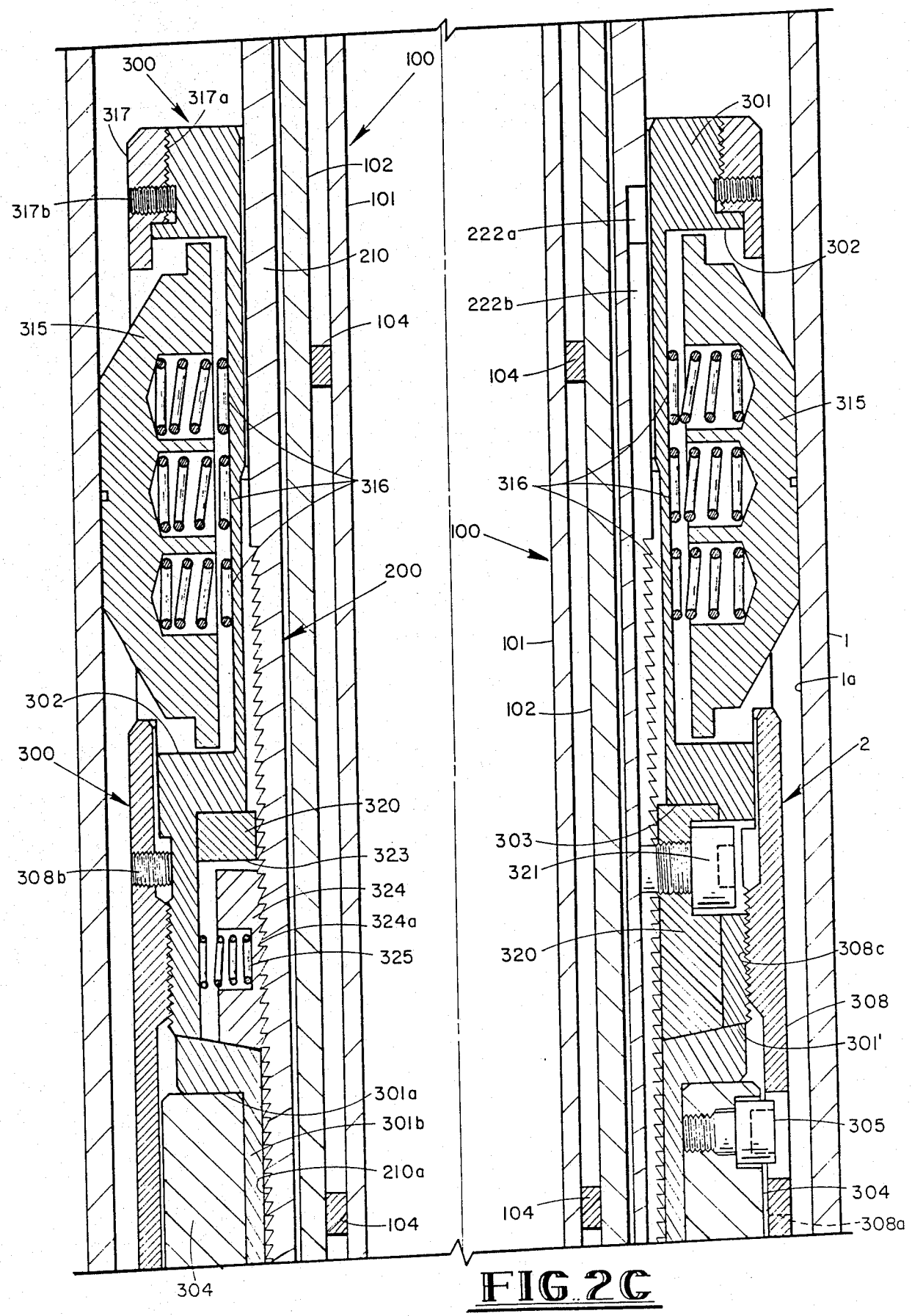
Figure 2D:
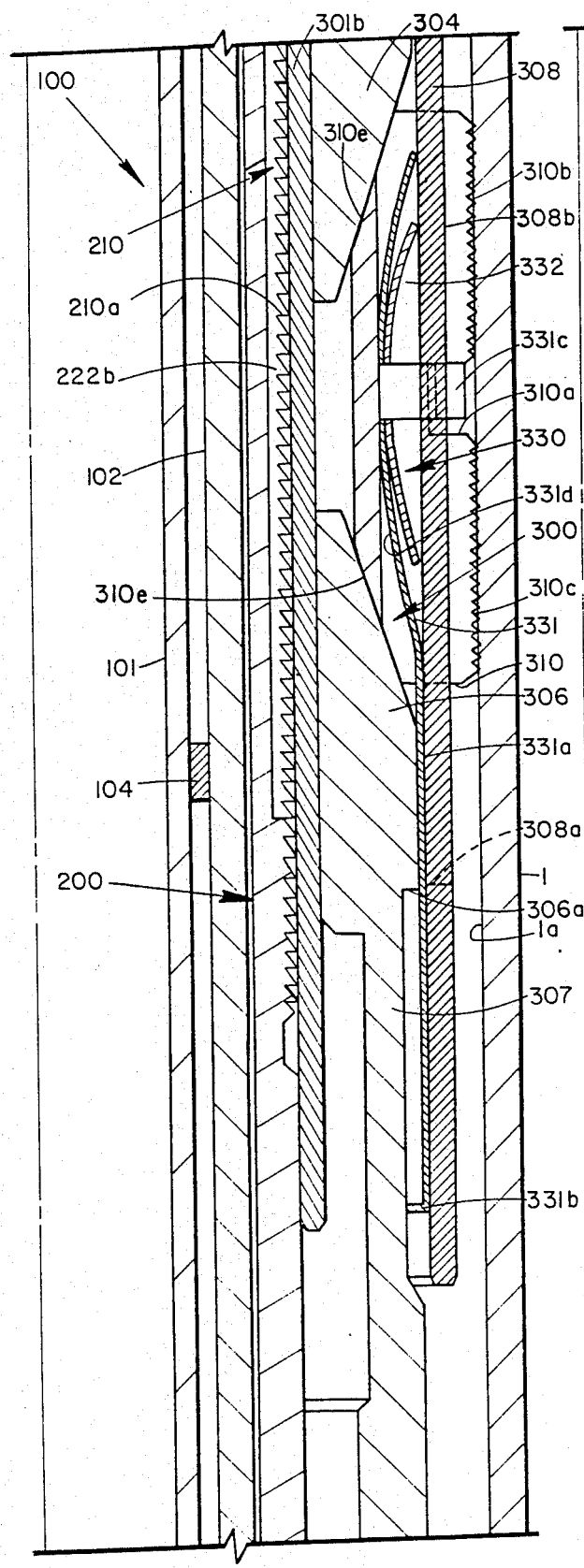
Figure 2E:
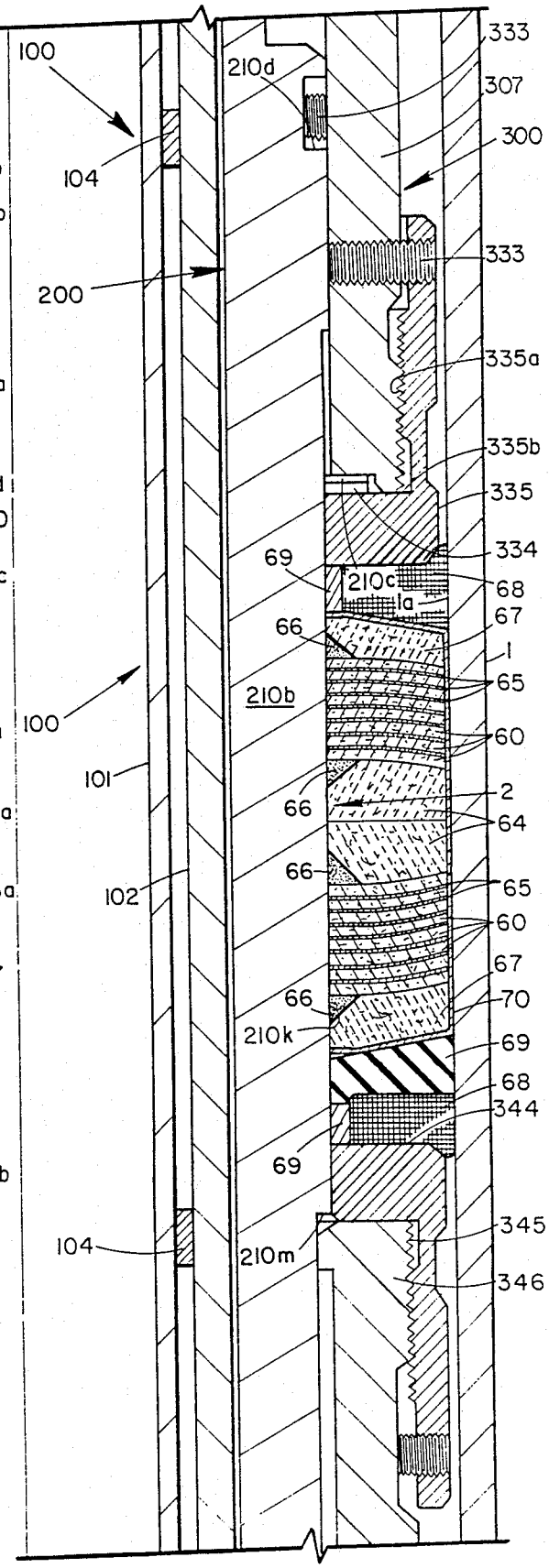
Figure 2F:
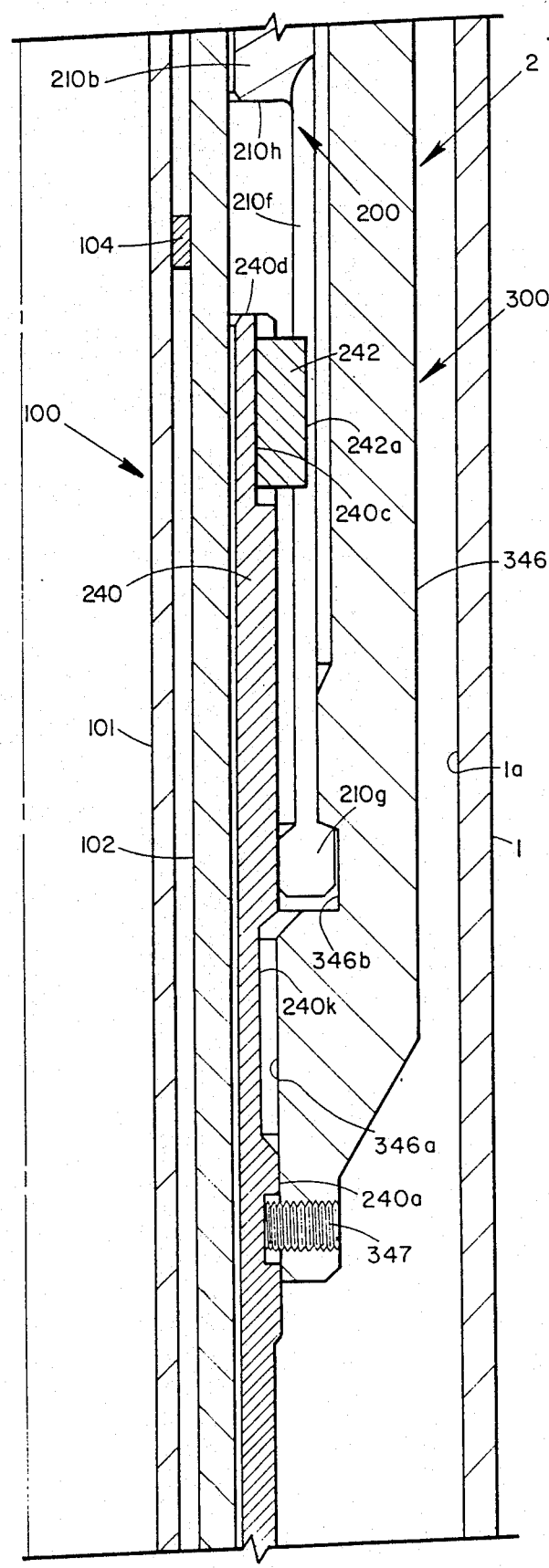
Figure 2G:
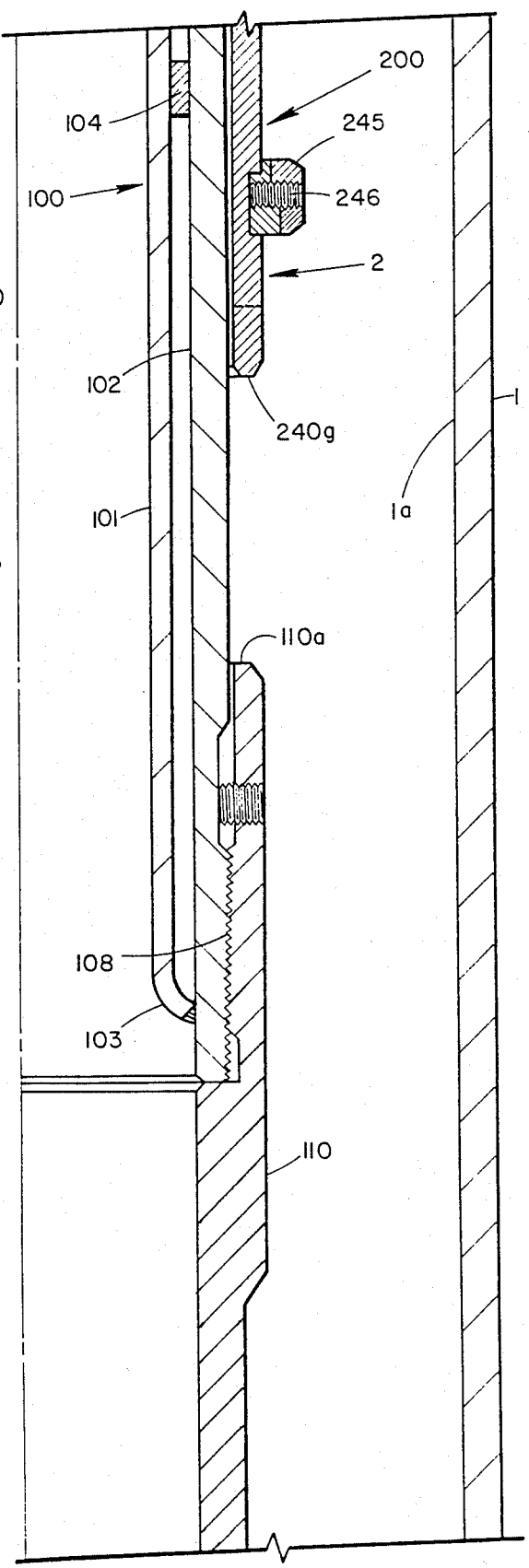

The outer packing assemblage 340 is inserted in the outer tubular assembly 300 in this configuration as shown in FIG. 1E. The application of an axial compressive force to the packing assemblage 340 will have the effect of deforming the assemblage 340 to assume the shape illustrated in FIG. 2E wherein the angularly deformed stacks of graphite discs are caused to assume an almost radial configuration, thus substantially increasing their outer diameters and producing a snug seal against the internal surface of the casing bore 1a and the external surface 210k of the inner tubular body 210. Moreover, the corresponding deformation of the metallic mesh rings 68 reduces the space for extrusion of the seal material, and, hence prevents degradation of the packing element under sustained high pressures.

If desired, a ring 69 formed of a normal sealing rubber or elastomer and having a non-perpendicular parallelogram cross section, may be incorporated in one axial end of the outer packing assemblage 340. This ring will assist in achieving an initial seal of the packing when the steam is initially introduced into the well and the resulting pressure on the packing element is not sufficient to completely deform it to its maximum sealing position. The rubber or elastomeric seal element 69 will, of course, degrade and disappear as it is exposed to the maximum temperature steam for an extended period, but his will not effect the effectiveness of the remainder of the packing element, because the steam pressure force is always continuously exerted on the packing assembly in a direction to maintain an axial compression force thereon.

Additionally, it may be desirable to encase all of the elements 60, 65 and 67 within a lead or lead antimony sheath 70 so as to protect such elements from injury during the run-in operation. The lead will, of course, melt and disappear as the temperature rises above its melting point due to the introduction of steam into the well.

OPERATION

Figure 3:
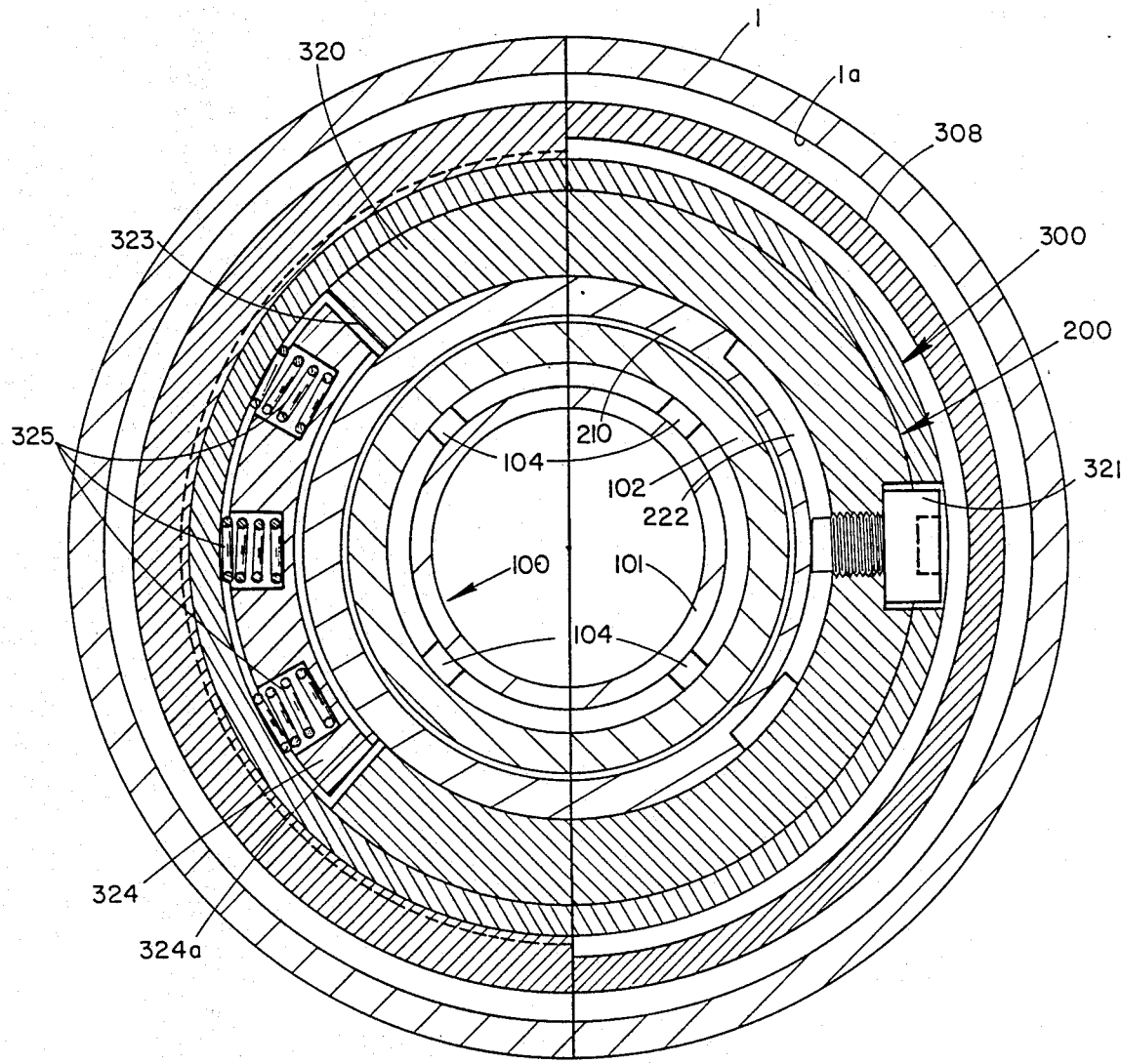
FIG. 3 is a sectional view taken on the plane 3—3 FIG. 1C.

The operation of the packer embodying this invention will be readily apparent to those skilled in the art. After the packer has been run into the well to the desired location with the elements thereof in the configuration illustrated in FIG. 1, the tubing string 3 is turned approximately 90° to the left thus effecting the rotation of the connector sub 10, top sub 201 and inner tubular body assembly 200 relative to the outer tubular operative assembly 300 due to the frictional engagement of the drag block assemblage 315 with the internal bore surface 1a of the casing 1. Such rotation of the inner tubular housing assembly 200 with respect to the outer tubular housing assembly 300 effects a displacement of the J-pin 321 in the horizontal portion 222a of the J-slot 222, thus positioning the J-pin 321 in alignment with the axially extending portion 222b of the J-slot as indicated by the dotted lines in FIG. 3.

An upward force is then applied to the tubing string resulting in the shearing of shear screws 333, thus releasing the internal tubular assembly 200 for axial movements relative to the outer operative tubular assembly 300. Such axial upward movement causes the J-pin 321 to move downwardly relative to the axial portion 222b of the J-slot 222.

As the upward movement of the inner tubular assembly 200 is continued, a compressive force is exerted on the outer packing assembly 340 and through that assembly to the lower cone 306 which moves upwardly toward the upper cone 304 and concurrently moves the slips 310 radially outwardly. As the slips 310 achieve a biting engagement with the bore 1a of the casing 1, any upward movement of the outer operative tubular assemblage 300 is prevented so that the continued application of an upward force results in further increasing the axial compression force on the outer packing assembly 340. At the same time, the detent 324 has ratcheted into engagement with the ratchet teeth 210a provided on the inner tubular body 210, thus trapping the axial force within the packing unit 340 and the slip elements 310.

After exerting an upward force on the order of 40,000 pounds, the preferred operation is to then apply a setdown force to the tubular string 3 which takes out any slack that may exist between the upper cone 304 and the slip 310. Such setdown force is then generally followed by a re-application of the upward force to make certain that the packer is still engaged with the casing wall. The sealing effectiveness of the packer would then be tested by increasing the pressure in the casing annulus to a desired level. Assuming the packer seals withstand such tests, the packer is then fully set and the tubing string is rotated to the right to shear screw 203 and disconnect the connector sub 10 from the left hand threads 202 provided in the top sub 201. The tubing string 3 is then elevated to space the mandrel 100 with respect to the packer so that subsequent expansion and contraction movements of the tubing string may be absorbed by relative movement between the mandrel 100 and the inner packing 208 without disturbing the fluid pressure sealing of the casing annulus.

Conventional apparatus is then applied to the tubing string at the well head and, in particular, connections are provided to a source of high pressure steam. The steam is supplied to the particular formation being treated through the bore of the insulated tubing string and the insulated mandrel 100. Heat loss of the steam by conductivity through the walls of the tubing string and the mandrel 100 is thereby minimized. As the temperature builds up below the packer, due to the introduction of the steam, a corresponding increase in pressure will accompany the temperature build-up. The packing elements are fully resistant to temperatures on the order of 700° F. and the increased steam pressure merely increases the axial compression force exerted on the outer packing assembly 340, thereby assuring that it will maintain its sealing effectiveness.

If, after the steaming operation is completed and the equipment permitted to cool somewhat, it is desired to remove the packer from the casing 1, such removal operation is conveniently accomplished by pulling up on the tubing string, which effects an upward movement of the mandrel 100 relative to the other elements of the packer. Such upward movement is continued until the shoulder 110a provided on the bottom of the mandrel 100 engages the downwardly facing end 240g of the extension sleeve 240 of the inner tubular assembly 200. An upward force imparted to the extension sleeve 240 will effect the shearing of shear screws 347 and permit the extension sleeve 240 to move upwardly relative to the force-transmitting sleeve 346 of the outer tubular assembly 300.

Such relative movement brings the annular recess 240k provided in the extension sleeve 240 into axial alignment with the enlarged head portions 210g of the collet arms 210f, permitting such head portions to be pivoted out of engagement with the recess 346b provided in the force-transmitting sleeve 346. Thus, the operative connection betwen the force-transmitting sleeve 346 and the inner tubular body 210 is disconnected, and the axial force applied to the exterior packing element 340 and also to the lower cone 306 is removed, permitting the slips 310 to retract out of engagement with the casing bore 1a. Further upward movement of the mandrel 100 brings the abutment ring 245 provided on the bottom end of the extension sleeve 240 of the inner tubular assembly 200 into engagement with the bottom end of the force-transmitting sleeve 346, but only after the spiral lock ring 334 has engaged the downwardly facing shoulder 210m provided on the exterior of the enlarged portion 210b of the inner tubular body 210. Thus, the mandrel 100, the inner tubular body assembly 200, and the outer operative tubular assembly 300 are all interconnected for upward removal from the well. The spiral lock spring 334 effectively prevents any accidental engagement of the slips 310 with the casing bore as the withdrawal is effected by assuring that the upper and lower cones are separated by a very substantial axial distance, while at the same time, the abutment sleeve 335 is positively prevented from imparting any upward movement to the sleeve extension 307 of the lower cone 306.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A packer for a subterranean well having a casing comprising, in combination, an inner tubular body assembly having connector means at its upper end for detachable threaded connection to the bottom of a tubing string whereby the packer may be run into the casing to a desired position; a outer operative tubing assembly mounted in surrounding relationship to a medial portion of said inner tubular body assembly; said outer tubular body assembly including a drag block unit, a connection block, a slip mechanism including peripherially spaced slips and upper and lower cone elements, an external packing element having one end abutting said lower cone element and deformable by axial force to sealing engage the bore of the casing, and an annular abutment element engaging the other end of said packing element; a J-pin radially transversing said connecting block, a J-slot in said inner tubular body assembly receiving said J-pin for securing said inner tubular body assembly and said outer tubular operative assembly in a fixed relationship during run-in of the packer in the casing with only said drag block unit engaging the casing wall; said J-pin and J-slot bewing operable by limited rotation of said inner tubular body assembly relative to said outer tubular operative assembly to release said assemblies for limited relative axial movememnt; collet means for detachably securing said inner tubular body assembly to said abutment element, whereby upward movement of said inner tubular body assembly produced solely by upward movement of the tubing string applies an axial force to said packing element and moves said lower cone element toward said upper cone element to expand said slips into biting engagement with the casing bore; axially extending ratchet teeth formed on the periphery of said inner tubular assembly; and a segment shaped detent unit radially shiftably mounted in said connecting block and having a serrated inner surface engagable with said ratchet teeth to prevent downward movement of said inner tubular body assembly relative to said outer tubular assembly, thereby locking the axial compressive force in said external packing element.

2. The apparatus defined in claim 1 wherein said inner tubular body assembly defines an internal sealing bore; a hollow mandrel inserted in the sealing bore of said annular inner tubular body assembly and sealingly engaged thereby, the upper end of said mandrel being secured to said connector means; and abutment means on the exterior of said mandrel below said outer operative tubing assembly engagable with said collet means by upward movement of the tubing string after setting of said packer and releasing said connector means from said inner tubular body assembly to release said abutment element from said tubular inner body assembly and release the axial force on said external packing element and on said lower cone element, thereby permitting retrieval of the entire packer.

3. A packer for a subterranean well having a casing extending through a production zone requiring steam treatment to improve fluid production from such zone comprising, in combination, an inner tubular body assembly having connector means at its upper end for detachable threaded connection to the bottom of a tubing string whereby the packer may be run into the casing to a position above the production zone to be steam treated; an outer operative tubing assembly mounted in surrounding relationship to a medial portion of said inner tubular body assembly; said outer tubular body assembly including a drag block unit, a connection block, a slip mechanism including peripherally spaced slips and upper and lower cone elements, a non-elastic, high temperature resistant external packing element having one end abutting said lower cone element and deformable by axial force to sealingly engage the wall of the casing; and an annular abutment element engaging the other end of said packing element; a J-pin radially traversing said connection block, a J-slot in said inner tubular body assembly receiving said J-pin for securing said inner tubular body assembly and said outer tubular operative assembly in a fixed relationship during run-in of the packer in the casing with only said drag block unit engaging the casing wall; said J-pin and J-slot being operable by limited rotation of said inner tubular body assembly relative to said outer tubular operative assembly to release said assemblies for limited relative axial movement; collet means for detachably securing said inner tubular body assembly to said annular abutment element; whereby upward movement of said inner tubular body assembly produced solely by upward movement of the tubing string applies an axial force to said packing element and moves said lower cone element toward said upper cone element to expand said slip elements into biting engagement with the casing wall; axially extending ratchet teeth formed on the periphery of said inner tubular assembly; and a segment shaped detent unit radially shiftably mounted in said connecting block and having a serrated inner surface engagable with said ratchet teeth to prevent downward movement of said inner tubular body assembly relative to said outer tubular assembly, thereby locking the axial compressive force in said packing element.

4. The apparatus defined in claim 3 wherein said inner tubular body assembly defines an internal, annular seal mounting recess; a non-elastic, high temperature resistant, internal seal assembly mounted in said internal seal mounting recess; a hollow mandrel inserted in the bore of said annular inner tubular body assembly and sealingly engaged by said high temperature resistant internal seal assembly, the upper end of said mandrel being secured to said connector means; and abutment means on the exterior of said mandrel below said outer operative tubing assembly engagable with said collet means by upward movement of the tubing string after setting said packer and releasing said connector means from said inner tubular body assembly to release said abutment element from said tubular inner body assembly and release the axial force on said temperature resistant external packing element and on said lower cone element, thereby permitting retrieval of the entire packer.

* * * * *